US010663355B2

(12) United States Patent
Green et al.

(10) Patent No.: US 10,663,355 B2
(45) Date of Patent: May 26, 2020

(54) THERMISTOR WITH TUNABLE RESISTANCE

(71) Applicant: Texas Instruments Incorporated, Dallas, TX (US)

(72) Inventors: Keith Ryan Green, Prosper, TX (US); Byron Jon Roderick Shulver, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 316 days.

(21) Appl. No.: 15/639,492

(22) Filed: Jun. 30, 2017

(65) Prior Publication Data

US 2019/0003900 A1  Jan. 3, 2019

(51) Int. Cl.
*G01K 7/25*  (2006.01)
*G01K 7/22*  (2006.01)
*G01K 7/02*  (2006.01)
*G01K 15/00*  (2006.01)
*G01K 7/16*  (2006.01)

(52) U.S. Cl.
CPC .............. *G01K 7/25* (2013.01); *G01K 7/023* (2013.01); *G01K 7/223* (2013.01); *G01K 15/005* (2013.01); *G01K 2007/163* (2013.01)

(58) Field of Classification Search
CPC ...... H01C 10/00; G01N 33/0037; G01K 7/14; G01K 7/22; G01K 7/16; G01K 13/02; G01K 7/226; G01K 15/005; G01K 2007/163; G01K 7/223; G01K 7/25
USPC ......... 374/185; 338/22 R; 257/670; 438/305, 438/306, 331
See application file for complete search history.

(56) References Cited

U.S. PATENT DOCUMENTS

| 3,056,100 | A | * | 9/1962 | Warner, Jr. | ............. H01L 29/00 338/25 |
| 3,936,789 | A |   | 2/1976 | Matzen et al. | |
| 9,460,834 | B2 | * | 10/2016 | Croci | ..................... G01L 9/0052 |
| 9,677,948 | B1 | * | 6/2017 | Arft | ....................... G01K 13/02 |
| 10,458,858 | B1 | * | 10/2019 | Arft | ....................... G01K 13/02 |
| 2008/0197967 | A1 | * | 8/2008 | Shyu | ........................ H01C 1/02 338/309 |
| 2012/0038700 | A1 |   | 2/2012 | Gulvin et al. | |

(Continued)

OTHER PUBLICATIONS

PCT Search Report for PCT/US18/40477, dated Oct. 18, 2018 (2 pages).

*Primary Examiner* — Gail Kaplan Verbitsky
(74) *Attorney, Agent, or Firm* — Mark Allen Valetti; Charles A. Brill; Frank D. Cimino

(57) ABSTRACT

A device having a first terminal region and a second terminal region. The first terminal region includes fine-tune (FT) metal stripes that are separated from each other by a first distance along the longitudinal direction. The second terminal region is spaced apart from the first terminal region by at least an inter-terminal distance. The second terminal region includes coarse-tune (CT) metal stripes that are separated from each other by a second distance along the longitudinal direction. The second distance is greater than the first distance, and the inter-terminal distance greater than the second distance. Each of the FT metal stripes may be selected as a first access location, and each of the CT metal stripes may be selected as a second access location. A pair of selected first and second access locations access a sheet resistance defined by a distance therebetween.

10 Claims, 7 Drawing Sheets

(56) References Cited

U.S. PATENT DOCUMENTS

| | | | |
|---|---|---|---|
| 2012/0212317 A1* | 8/2012 | Bulmer | H01C 3/06 |
| | | | 338/214 |
| 2015/0016487 A1* | 1/2015 | Britton | G01K 1/20 |
| | | | 374/185 |
| 2015/0023393 A1* | 1/2015 | Britton | G01K 7/24 |
| | | | 374/185 |
| 2015/0061094 A1 | 3/2015 | Fan | |
| 2015/0249116 A1 | 9/2015 | Hiroki et al. | |
| 2015/0318087 A1* | 11/2015 | Croci | G01L 9/0052 |
| | | | 338/114 |
| 2015/0348854 A1* | 12/2015 | Kapoor | H01L 21/0262 |
| | | | 438/10 |
| 2016/0064123 A1* | 3/2016 | Flachowsky | H01C 1/16 |
| | | | 338/22 SD |
| 2016/0111415 A1 | 4/2016 | Basler et al. | |

\* cited by examiner

THERMISTOR WITH TUNABLE RESISTANCE

BACKGROUND

A thermistor is a resistor with a variable resistance responsive to a change in a surrounding temperature. The rate of change of the variable resistance over the change of temperature defines a temperature coefficient of a thermistor. A thermistor may have a positive or negative temperature coefficient depending on its device physics and mechanical structure. Thermistors have many industrial applications. For instance, thermistors with negative temperature coefficients (NTC) can be used for protecting an electrical component against inrush overvoltage conditions, whereas thermistors with positive temperature coefficient (PTC) can be used for protecting an electrical component against overcurrent conditions.

SUMMARY

The present disclosure describes systems and techniques relating to the fabrication and calibration of thermistors with tunable resistances. In general, the disclosed thermistor includes a first terminal region, a second terminal region, and a tunable resistance defined by a combination of a first selection of the first terminal region and a second selection of the second terminal region. The combinations of the first and second selections may be used to fine-tune and/or coarse-tune a longitudinal segment of sheet resistance near a top surface of a semiconductor surface. Advantageously, the disclosed thermistor provides a low cost and size efficient solution for precision temperature sensing.

In one implementation, for example, the present disclosure introduces a device having a doped region extending along a longitudinal direction, a first terminal region above the doped region, and a second terminal region above the doped region. The first terminal region includes fine-tune (FT) metal stripes that are arranged in parallel with and separated from each other by a first distance along the longitudinal direction. The second terminal region is spaced apart from the first terminal region by at least an inter-terminal distance. The second terminal region includes coarse-tune (CT) metal stripes that are arranged in parallel with and separated from each other by a second distance along the longitudinal direction. The second distance is greater than the first distance, and the inter-terminal distance at least 10 times greater than the second distance. Each of the FT metal stripes may serve as a first access location, and each of the CT metal stripes may serve as a second access location. A pair of first and second access locations may be selected for accessing a sheet resistance defined by a distance between the pair of access locations. In general, the sheet resistance increases with the distance between two access locations.

In another implementation, for example, the present disclosure introduces a device having an n doped region extending along a longitudinal direction, a first terminal region in the n doped region, a second terminal region in the n doped region, and isolation structures in the first terminal region. The first terminal region includes fine-tune (FT) n+ doped regions separated from each other by a first distance along the longitudinal direction. Each of the FT n+ regions has a first pitch along the longitudinal direction. The isolation structures interdigitate with the FT n+ doped regions along a surface of the n doped region. The isolation structures having a second pitch less than the first pitch. The second terminal region is spaced apart from the first terminal region by at least an inter-terminal distance. The second terminal region includes coarse-tune (CT) n+ doped regions separated from each other by a second distance along the longitudinal direction. The second distance greater than the first distance and less than the inter-terminal distance. Each of the FT n+ doped regions may serve as a first access location, and each of the CT n+ doped regions may serve as a second access location. A pair of first and second access locations may be selected for accessing a sheet resistance defined by a distance between the pair of access locations. In general, the sheet resistance increases with the distance between two access locations.

DRAWING DESCRIPTIONS

Figure 1A:
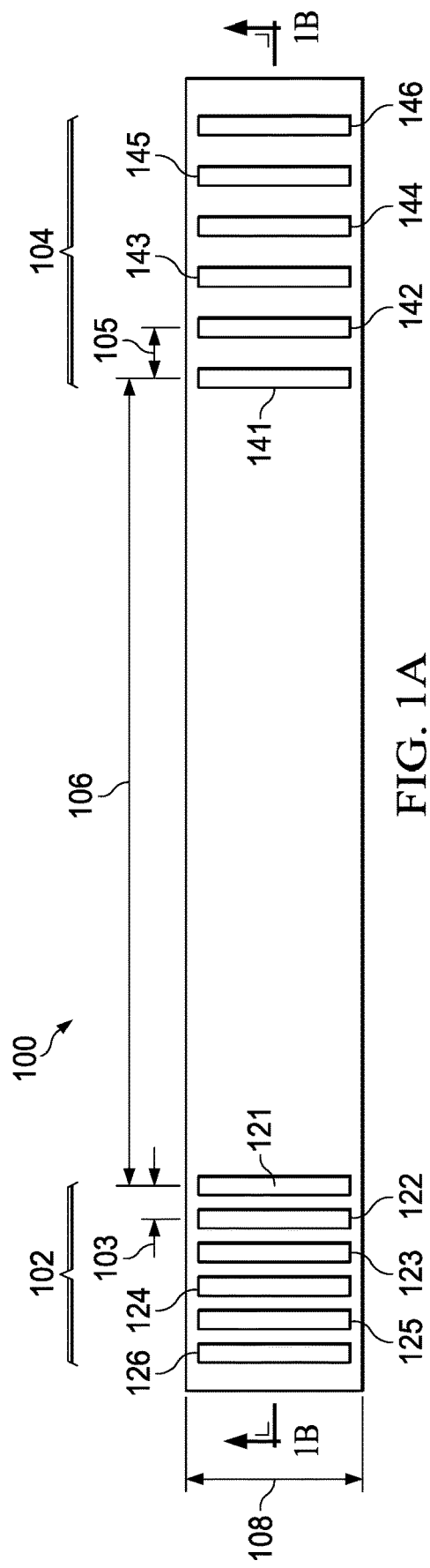
FIG. 1A shows a top view of a tunable thermistor according to an aspect of the present disclosure.

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

The present disclosure introduces a thermistor device with a resistance that can be a (e.g., fine-tune or coarse-tune) after a wafer fabrication process is completed. In general, the resistance of the disclosed thermistor is contributed by a sheet resistance distributed along a doped region near a top surface of a semiconductor surface. The dopant concentration of the doped region correlates to a temperature coefficient of the sheet resistance. In the implementations illustrated below, the sheet resistance has a positive temperature coefficient (PTC) such that the resistance of the thermistor increases with increasing temperature. Alternatively, the sheet resistance may have a negative temperature coefficient (NTC) such that the resistance of the thermistor decreases with increasing temperature.

The resistance tuning of the present disclosure is pertinent to adjusting one or more dimensions of a terminal segment having a sheet resistance. The disclosed resistance tuning is independent of other forms of resistance tuning, such as spreading resistance tuning. The overall resistance of a thermistor can be adjusted by three factors: a sheet resistance $R_{SH}$ of a surface segment, a length L of the surface segment, and a width W of the surface segment. The overall resistance R may be defined by Equation (1) as expressed below.

$$R = R_{SH} \frac{L}{W} \qquad \text{Eq.(1)}$$

The sheet resistance $R_{SH}$ is also a function of a resistivity p over a thickness t of the sheet segment. Thus, the overall resistance R may also be defined by Equation (2) as expressed below.

$$R = \frac{\rho}{t} * \frac{L}{W} \qquad \text{Eq.(2)}$$

As a point of reference, the length of a resistor aligns with a first direction (e.g., longitudinal direction) where current is expected to flow, whereas the width of a resistor aligns with a second direction that is perpendicular to the first direction. Thus, the overall resistance of a sheet segment is directly proportional to the length, and inversely proportion to the width, of the sheet segment. If the sheet resistance $R_{SH}$ of a resistor is evenly distributed along the sheet segment, the resistance of the resistor can be tuned by trimming the length and/or the width of the resistor. Because the length of a resistor is typically greater than its width, trimming the length of a resistor may incur much less overhead size than trimming the width of a resistor. To achieve size efficiency, the example implementations below focus on length trimming a resistor although width trimming is permitted as well.

Figure 1B:
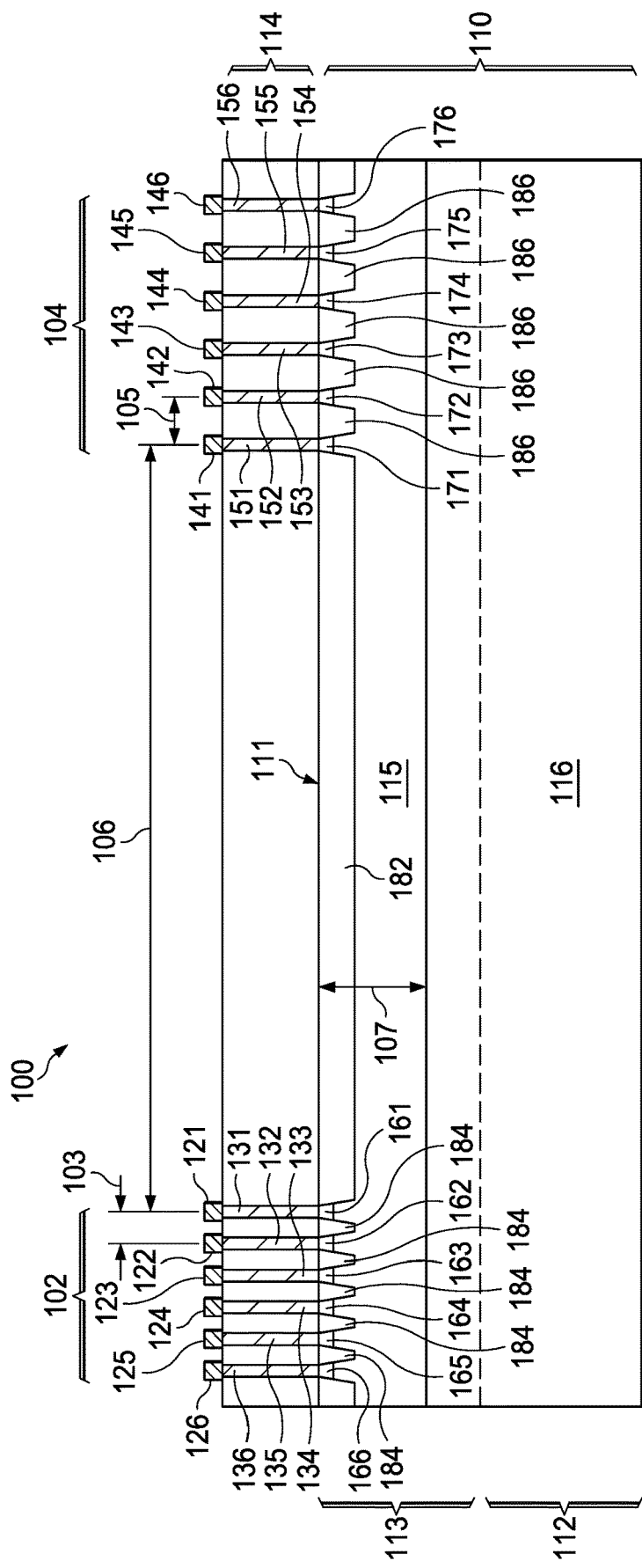
FIG. 1B shows a cross-sectional view of the tunable thermistor according to an aspect of the present disclosure.

FIGS. 1A and 1B show a top view and a cross-sectional view of an example tunable thermistor 100. The tunable thermistor 100 can be fabricated on a semiconductor (e.g., a silicon material) substrate 110, which may be a single bulk substrate, or a bulk substrate 112 with an epitaxially grown layer (or "epitaxial layer") 113. The substrate 110 has a top surface 111, under which a doped region 115 may be formed. The doped region 115 can be a region extending from the top surface 111 or a layer buried under the top surface 111. The doped region 115 has a dopant concentration and a thickness 107. The doped region 115 has a sheet resistance that correlates to the dopant concentration and the thickness 107. In general, the dopant concentration has an inverse relationship with the resistivity p of the sheet resistance. The doped region 115 can be an n doped region or a p doped region although the following discussion focuses on the doped region 115 being an n doped region. The substrate 110 may include a doped layer 116 having the opposite conductivity type to the doped region 115.

The tunable thermistor 100 has a resistance defined by a width 108, a length (e.g., 106 and potentially multiples of 103 and 105), and a sheet resistance provided by the doped region 115 along the top surface 111 and as expressed in Equations (1) and (2) above. Where the thermistor 100 has a 10 k ohm target resistance value, for example, the width 108 may be about 20 μm and the length 106 may be about 65 μm. The tunable thermistor 100 has a first terminal region 102 and a second terminal region 104. An inter-terminal distance between the first and second terminal regions 102 and 104 defines the length of the thermistor 100, which corresponds to the resistance of the thermistor 100. Based on the selections provided in each of the first and second terminal regions 102 and 104, the thermistor 100 has a minimum inter-terminal distance 106 measuring the shortest separation between the first and second terminal regions 102 and 104. The minimum inter-terminal distance 106 corresponds to a minimum resistance of the thermistor 100.

Each of the first terminal region 102 and the second terminal region 104 includes one or more access locations for adjusting the resistance of the tunable thermistor 100. Within the configurations of these access locations, the minimum inter-terminal distance 106 may be understood as the distance between a pair of closest access locations, having one of each in either the first or second terminal regions 102 or 104. For instance, the minimum inter-terminal distance 106 can be defined between a first access location (e.g., 121, 131, and 161 collectively) in the first terminal region 102 and a second access location (e.g., 141, 151, and 171 collectively) in the second terminal region 104.

When an access location of each terminal regions 102 and 104 is selected for connection with an external circuit, additional length segments (e.g., segments measured by a first distance 103 and/or a second distance 105) in the n doped region 115 may be selectively added to the minimum inter-terminal distance 106. This selective summation (or accumulation) of additional length segments allows the resistance value of the thermistor 100 to be adjusted (e.g., fine tune and/or coarse tune) rather effortlessly after the wafer fabrication process is completed. Advantageously, these post fabrication adjustments provides a cost-efficient solution to maintain a tight resistance tolerance (e.g., 1% variation within a target resistance value) and a high temperature coefficient (e.g., greater than 5000 ppm/° C.) for temperature sensitive applications.

The number of access locations and spacing between the access locations in each of the first and second terminal regions 102 and 104 depend on the product resolution and fabrication margin of the thermistor 100. In one implementation, for example, the access locations in the first and second terminal regions 102 and 104 may have equal spacing. In another implementation, the first and second terminal regions 102 and 104 may have equal number of access locations. In yet another implementation, the access locations in the first terminal region 102 may have different spacing from the access locations in the second terminal region 104.

More specifically, the terminal region (e.g., the first terminal region 102) having a first distance 103 between access locations may serve as a fine-tune (FT) terminal region, whereas the terminal region (e.g., 104) having a second distance 105 between access locations may serve as a coarse-tune (CT) terminal region. For the purpose of differentiating the resolutions between fine-tuning and coarse tuning, the first distance 103 may serve as a FT distance, whereas the second distance 105 may serve as a CT distance that is greater than the FT distance. The FT distance 103 defines an incremental FT resistance to be accumulated to the minimum resistance that is attributed by the minimum inter-terminal distance 106. Likewise, the CT distance 105 defines an incremental CT resistance to be accumulated to the minimum resistance that is attributed by the minimum inter-terminal distance 106. Advantageously, a large combinations of FT and CT resistance values can be selectively accessed by coupling to at least one access location in each of the first and second terminal regions 102 and 104.

Each access location may include multiple layers near and above the top surface 111 of the substrate 110. To access the sheet resistance provided by the n doped region 115, each access location includes a contact region, which is a heavily doped (e.g., an n+ doped) region having the same conductivity as the doped region 115. The contact region extends from the top surface 111 to the doped region 115. The contact regions may include a silicide material, and they each has a higher dopant concentration than the n doped region 115, and the contact (e.g., n+ doped) regions are isolated from each other by one or more isolation structures, which can be shallow trench isolation (STI) structures or local oxidation of silicon (LOCOS) structures.

In one implementation, for example, the first terminal region 102 may include 6 access locations, each of which includes an n+ doped region (161, 162, 163, 164, 165, and 166 respectively) in the n-doped region 115 serving as a FT contact. To isolate the access locations from one another, the n+ doped regions 161, 162, 163, 164, 165, and 166 are separated and isolated by isolation structures 184. Likewise, the second terminal region 104 may include 6 access locations, each of which includes an n+ doped region (171, 172, 173, 174, 175, and 176 respectively) in the n-doped region 115 serving as a CT contact. To isolate the access locations from one another, the n+ doped regions 171, 172, 173, 174, 175, and 176 are separated and isolated by isolation structures 186.

Moreover, to isolate the first terminal region 102 from the second terminal region 104, the pair of closest n++ doped regions 161 and 171 are separated and isolated by an inter-terminal isolation structure 182. In general, the inter-terminal isolation structure 182 has a greater length than the isolation structures 184 and 186 along the longitudinal direction. In one implementation, for example, the inter-terminal isolation structure 182 is at least 10 times longer than the isolation structure 184 and at least 5 times longer than the isolation structure 186.

The heavily doped regions in the first terminal region 102 (e.g., FT n+ doped regions 161, 162, 163, 164, 165, and 166) are separated from each other by a first distance 103; and the heavily doped regions in the second terminal region 104 (CT n+ doped regions 171, 172, 173, 174, 175, and 176) are separated from each other by a second distance 105. For the purpose of differentiating the resolutions between fine-tuning and coarse tuning, the first distance 103 may serve as a FT distance, whereas the second distance 105 may serve as a CT distance that is greater than the FT distance. In one implementation, for example, the second distance 105 may be 5 times greater than the first distance 103. Alternatively, if such a differentiation is not required, the first distance 105 may be substantially the same as the second distance 103. Moreover, the minimum inter-terminal distance 106 is generally greater than the first and second distances 103 and 105, such that the resistance attributed by the minimum inter-terminal distance 106 may dominate over the fine tune resistance value and the coarse tune resistance value. In one implementation, for example, the minimum inter-terminal distance 106 may be at least 10 times greater than the second distance 105.

Moreover, for the purpose of differentiating the resistive resolutions between fine-tuning and coarse tuning, each of the FT n+ doped regions (161, 162, 163, 164, 165, and 166) may have a FT pitch width (e.g., 402 in FIG. 3), whereas each of the CT n+ doped regions (171, 172, 173, 174, 175, and 176) may have a CT pitch width that is greater than the FT pitch width. Alternatively, if such a differentiation is not required, the first and second n+ doped regions may have substantially the same pitch width.

To access the contact regions, each access location includes a contact metal layer extending through a dielectric layer 114 that is formed on the top surface 111. The metal contact layer may include a tungsten metal or other similar conductive materials. In one implementation, for example, the access locations of the first terminal region 102 may each include a contact metal layer (131, 132, 133, 134, 135, and 136 respectively) to make ohmic contacts with one of the contact regions (161, 162, 163, 164, 165, and 166 respectively). Likewise, the access locations of the second terminal region 104 may each include a contact metal layer (151, 152, 153, 154, 155, and 156 respectively) to make ohmic contacts with one of the contact regions (171, 172, 173, 174, 175, and 176 respectively).

Each access location may further include a metal stripe for accessing the contact regions. The metal stripes are positioned above the dielectric layer 114, and they each makes an ohmic contact with one of the contact metal layers. The metal stripes may include an aluminum metal or other similar conductive materials. In one implementation, for example, the access locations of the first terminal region 102 may each include a first metal stripe (121, 122, 123, 124, 125, and 126 respectively) to make ohmic contacts with one of the metal contact layers (131, 132, 133, 134, 135, and 136 respectively). The first metal stripes 121, 122, 123, 124, 125, and 126 can be selectively connected by an external circuit for fine-tuning the resistance of the tunable thermistor 100. The first metal stripes 121, 122, 123, 124, 125, and 126 are arranged in parallel with each other, and they are also separated from each other by a first distance 103 along a longitudinal direction of the n doped region 115 (i.e., the direction along which the inter-terminal distance 106 is defined).

Likewise, the access locations of the second terminal region 104 may each include a second metal stripe (141, 142, 143, 144, 145, and 146 respectively) to make ohmic contacts with one of contact metal layer (151, 152, 153, 154, 155, and 156 respectively). The second metal stripes 141, 142, 143, 144, 145, and 146 can be selectively connected by an external circuit for coarse-tuning the resistance of the tunable thermistor 100. The second metal stripes 141, 142, 143, 144, 145, and 146 are arranged in parallel with each other, and they are also separated from each other by a second distance 105 along the longitudinal direction of the n doped region 115 (i.e., the direction along which the inter-terminal distance 106 is defined).

For the purpose of differentiating the resolutions between fine-tuning and coarse tuning, the first distance 103 may serve as a FT distance, whereas the second distance 105 may serve as a CT distance that is greater than the FT distance. In one implementation, for example, the second distance 105 may be 5 times greater than the first distance 103. Alternatively, if such a differentiation is not required, the first distance 105 may be substantially the same as the second distance 103. Moreover, the minimum inter-terminal distance 106 is generally greater than the first and second distances 103 and 105, such that the resistance attributed by the minimum inter-terminal distance 106 may dominate over the fine tune resistance value and the coarse tune resistance value. In one implementation, for example, the minimum inter-terminal distance 106 may be at least 10 times greater than the second distance 105.

The maximum length of the thermistor 100 can be measured between the far end FT metal stripe 126 and the far end CT metal stripe 146. When an external circuit is coupled to the far end FT access point (e.g., 126, 136, and 166 collectively) and the far end FT access point (e.g., 146, 156, and 176 collectively), all of the sheet resistance within the first and second terminal regions 102 and 104 are being serially summed into the total resistance of the thermistor 100. Thus, the external circuit may selectively access a maximum resistance provided by the sheet resistance in the n doped region 115. By contrast, when an external circuit is coupled to the near end FT access point (e.g., 121, 131, and 161 collectively) and the near end CT access point (e.g., 141, 151, and 171 collectively), almost all of the sheet resistance within the first and second terminal regions 102 and 104 are being excluded from the total resistance of the thermistor 100. As a result, the external circuit may selectively access a minimum resistance provided by the sheet resistance in the n doped region 115.

Under a 6-by-6 FT-to-CT access location configuration, the tunable thermistor 100 provides 36 adjustable resistance combinations. Consistent with the present disclosure, other FT-to-CT access location configurations are possible. In general, the thermistor 100 may have an N-by-M FT-to-CT access location configuration, where N≥1 when M>2, or M≥1 when N>2. To adjust the thermistor 100, a measurement can be made between two access locations in the first and second terminal regions 102 and 104 respectively. For instance, the measurement can be made between the near end FT access location (e.g., 121, 131, and 161 collectively) and the near end CT access location (e.g., 141, 151, and 171 collectively). A particular CT access location can be selected to minimize a difference between a target resistance value (e.g., 10 k ohm) and the measurement made (e.g., 11 k ohm). Upon a particular CT access location is selected, the resistance of the thermistor 100 may be incremented by a FT resistive value when a FT selection is switched from the near end FT access location to the far end FT access location by a single FT access location. Likewise, the resistance of the thermistor 100 may be decremented by a FT resistive value when a FT selection is switched from the far end FT access location to the near end FT access location by a single FT access location.

The first distance 103 and the second distance 105 may be derived based on a resistive resolution and the total length of the thermistor 100. To achieve a FT resolution of 0.5% for instance, the first distance 103 may be set at 0.5% of the maximum length. Likewise, to achieve a CT resolution of 3%, the second distance 105 may be set at 3% of the maximum length. Under these settings, the tunable thermistor 100 includes 6×6=36 resistance combinations ranging from about +10% to about −10% of a target resistance value. As another example, the first distance 103 may be set at 1% of the maximum length to achieve a FT resolution of 0.5%. Likewise, the second distance 105 may be set at 6% of the maximum length to achieve a CT resolution of 6%. Under these settings, the tunable thermistor 100 includes 6×6=36 resistance combinations ranging from about +20% to about −20% of a target resistance value.

Figure 2:
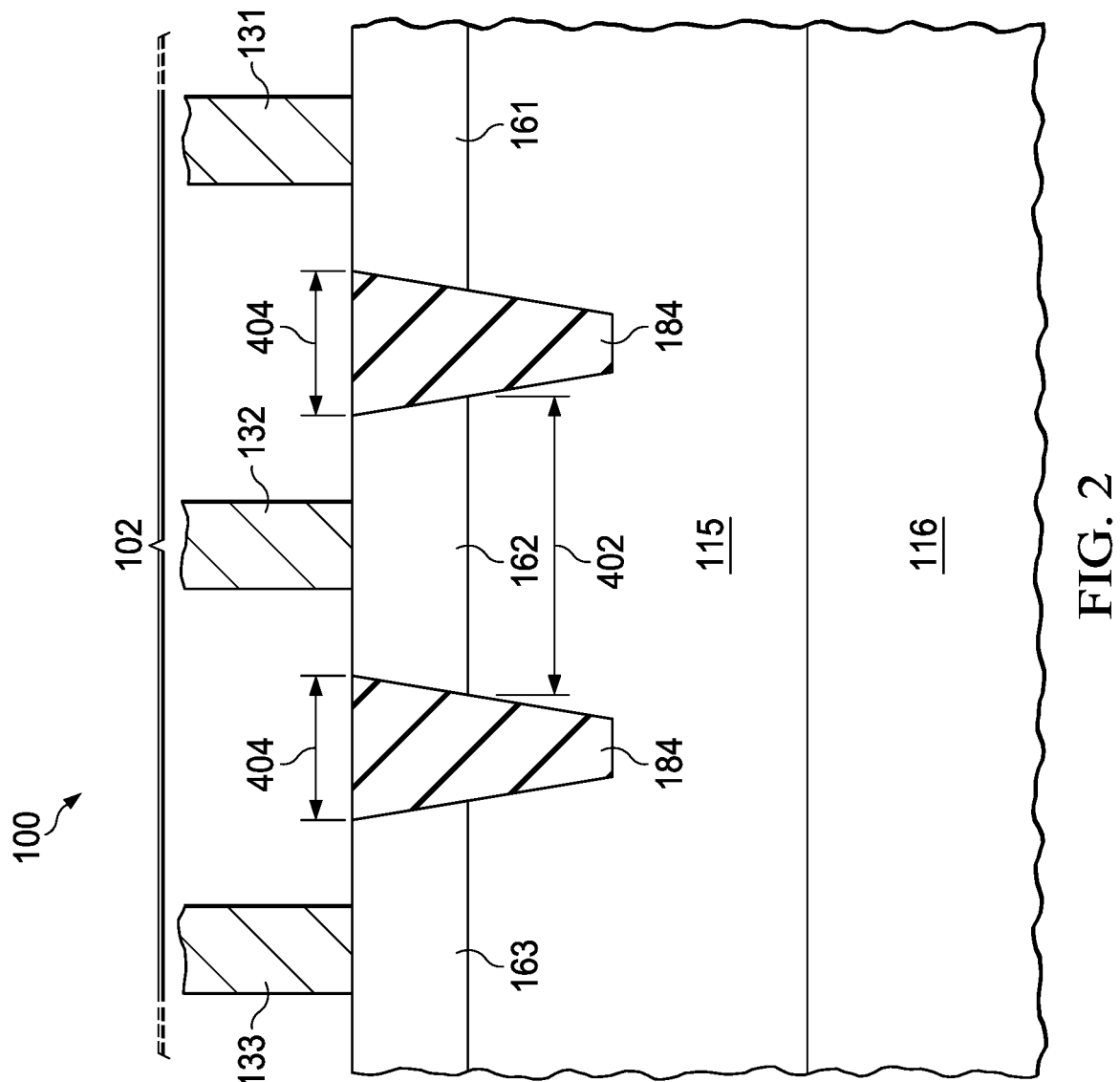
FIG. 2 shows an expanded cross-sectional view of the tunable thermistor according to an aspect of the present disclosure.
Figure 3:
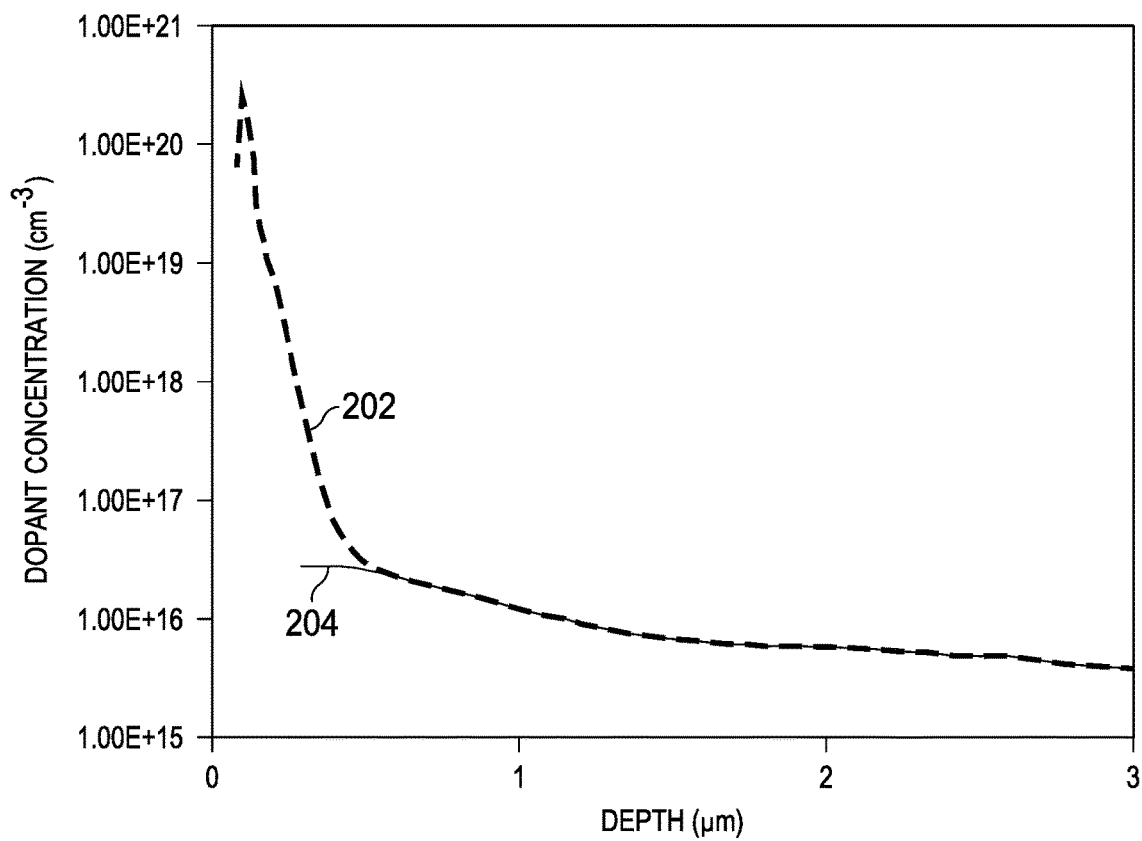
FIG. 3 shows a dopant concentration chart of the tunable thermistor according to an aspect of the present disclosure.

As an additional advantage, the tunable thermistor 100 may provide adjustable temperature coefficient by a selection made in the first terminal region 102. FIG. 2 shows an expanded cross-sectional view of the first terminal region 102 in the tunable thermistor 100. According to an aspect of the present disclosure, the heavily doped region (e.g., the FT n+ region 162) in the first terminal region 102 may have a first pitch (or a "contact pitch") 402, and the isolation structure 184 in the first terminal region 102 may have a second pitch (or an "isolation pitch") 404 that is less than the first pitch 402. Referring to FIG. 3, the vertical region under the first pitch 402 may have a first vertical dopant concentration profile 202 along the thickness direction of the n doped region 115. Likewise, the vertical region under the second pitch 404 may have a second vertical dopant concentration profile 204 along the thickness direction of the n doped region 115. The first vertical dopant concentration profile 202 is substantially higher than the second vertical dopant concentration profile 204 near the top surface 111 of the substrate 110. At a depth of about 0.2 μm from the top surface 111, the first vertical dopant concentration is above $1 \times 10^{17}$ cm$^{-3}$, whereas the second vertical dopant concentration is below $1 \times 10^{17}$ cm$^{3-}$.

Figure 4:
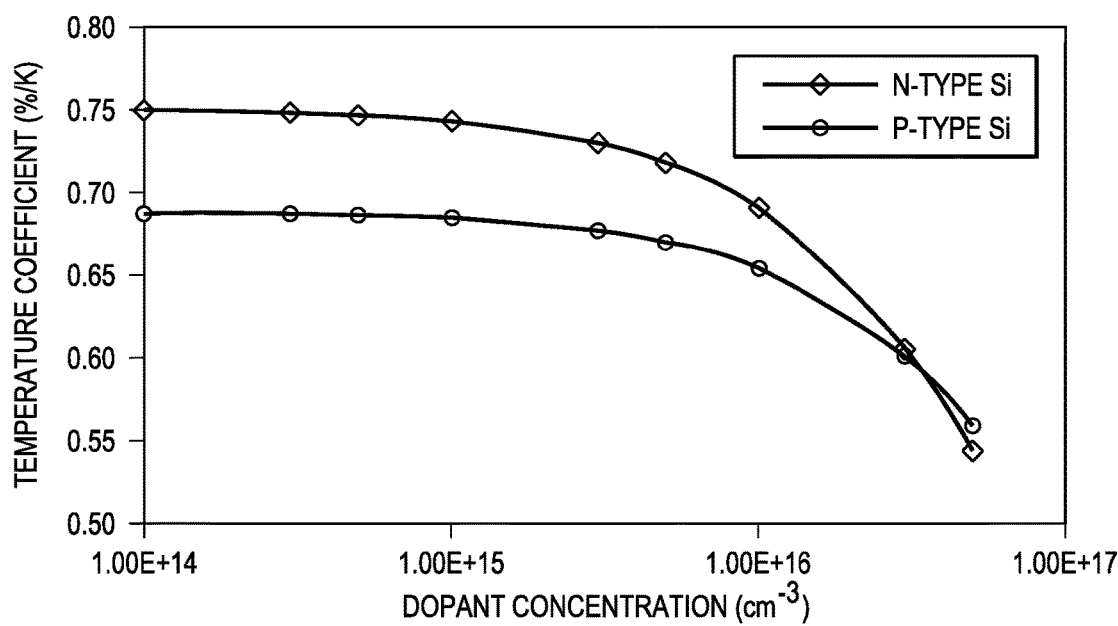
FIG. 4 shows a temperature coefficient chart of the tunable thermistor according to an aspect of the present disclosure.

Referring to FIG. 4, the temperature coefficient of a doped semiconductor region may have a relatively sharp decline when its dopant concentration increases from $1 \times 10^{16}$ cm$^{-3}$ to $1 \times 10^{17}$ cm$^{-3}$. Because the first pitch 402 is wider than the second pitch 404, the region under the first pitch 402 may dominate the region under the second pitch 404 to reduce the overall temperature coefficient when the sheet resistance under the first pitch 402 is selected. This dominance may be attributed to the significantly higher dopant concentration of the region under the first pitch 402 as well. As such, the thermistor 100 may have a lesser temperature coefficient when a greater number of the sheet resistance segments are selected within the first terminal region 102. By contrast, the thermistor 100 may have a greater temperature coefficient when a lesser number of the sheet resistance segments are selected within the first terminal region 102.

Referring again to FIG. 1B, when the far end FT access location (126, 136, and 166 collectively) is selected, the maximum number of sheet resistance segments are selected within the first terminal region 102. Thus, selecting the far end FT access location allows the thermistor 100 to have a minimum temperature coefficient for a range of CT resistance values with a selection of the CT access location. By contrast, when the near end FT access location (121, 131, and 161 collectively) is selected, the minimum number of sheet resistance segments are selected within the first terminal region 102. Thus, selecting the near end FT access location allows the thermistor 100 to have a maximum temperature coefficient for a range of CT resistance values with a selection of the CT access location.

Figure 5:
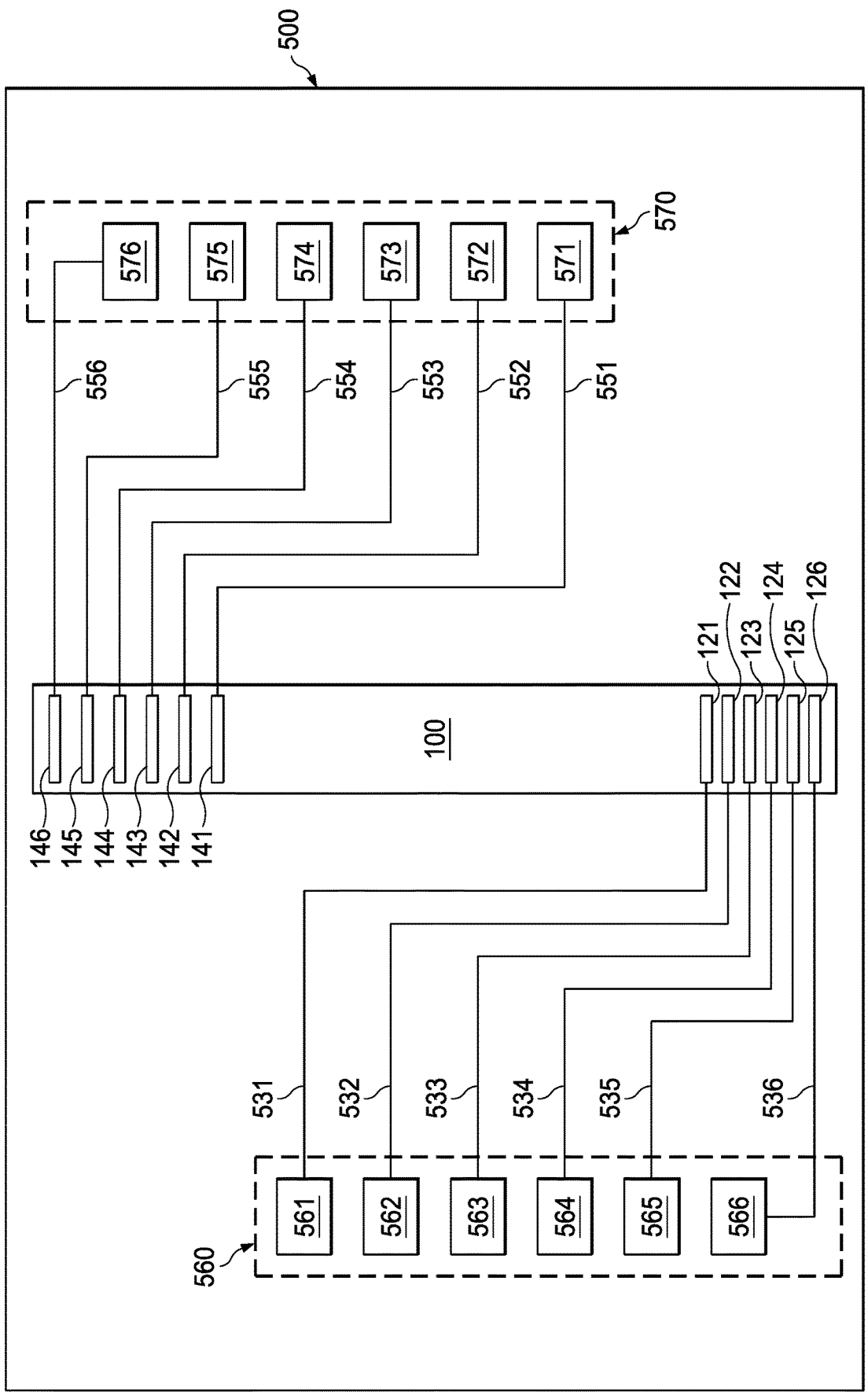
FIG. 5 shows a top view of a tunable thermistor die according to an aspect of the present disclosure.

Aside from the tunable thermistor 100, the present disclosure provides several means for selecting and accessing the FT access locations and the CT access locations of the tunable thermistor 100. FIG. 5 shows a top view of a tunable thermistor die 500 according to an aspect of the present disclosure. The die 500 includes the tunable thermistor 100 as shown and described in FIGS. 1-4, a first bond pad group 560 and a second bond pad group 570. The first bond pad group 560 includes a number of first bond pads that matches with the number of FT access locations of the thermistor 100. In one implementation, for example, the first bond pad group 560 includes bond pads 561-566, each of which is coupled to one of the FT metal stripes 121-126 respectively via one of the corresponding metal wires 531-536. In one implementation, only one of the bond pads 561-566 will be connected to an external circuit for selecting one of the access locations via one of the FT metal stripes 121-126.

The second bond pad group 560 includes a number of second bond pads that matches with the number of CT access locations of the thermistor 100. In one implementation, for example, the second bond pad group 570 includes bond pads 571-576, each of which is coupled to one of the CT metal stripes 141-146 respectively via one of the corresponding metal wires 551-556. In one implementation, only one of the bond pads 571-576 will be connected to an external circuit for selecting one of the access locations via one of the CT metal stripes 141-146.

Figure 6:
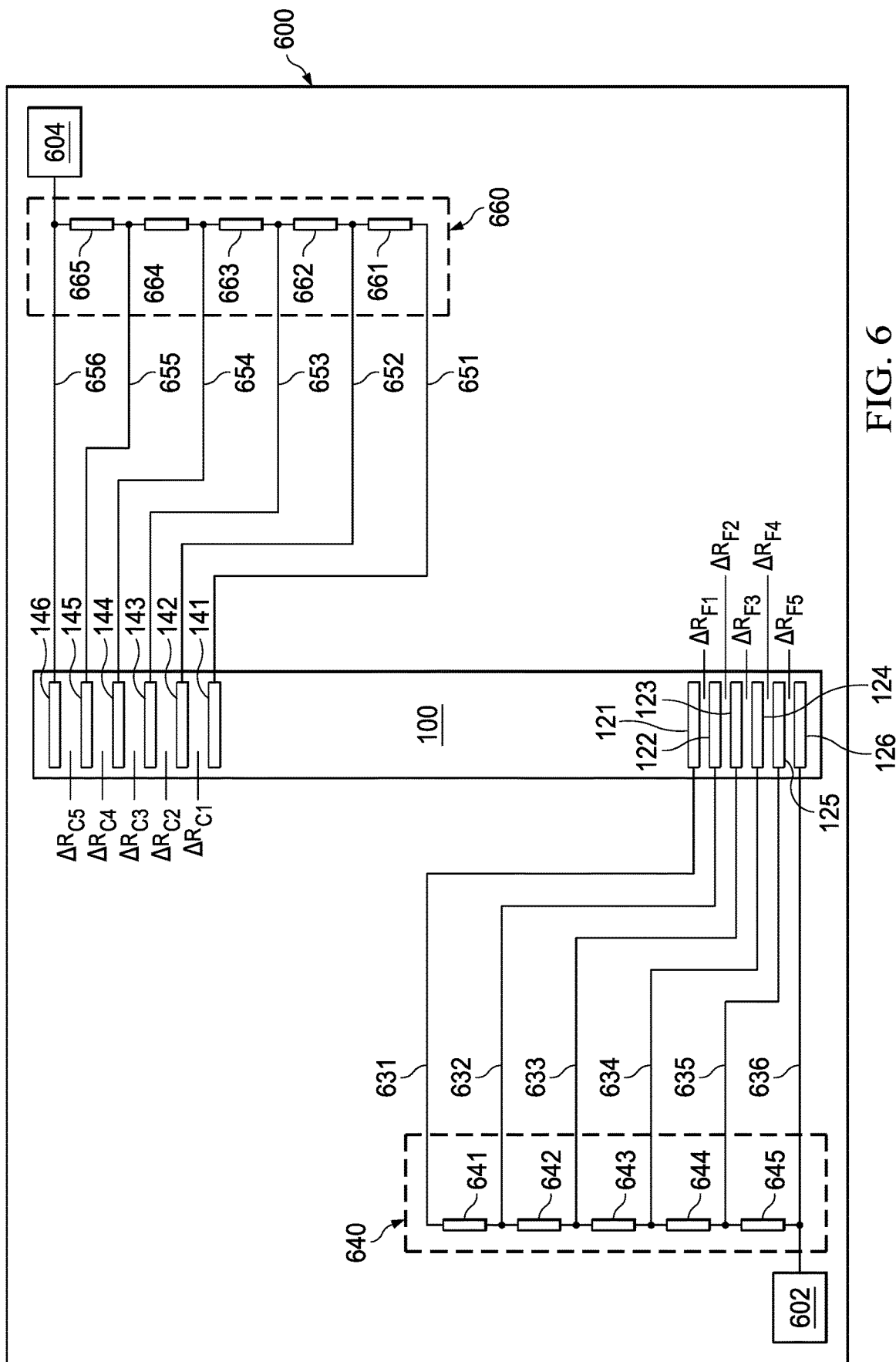
FIG. 6 shows a top view of another tunable thermistor die according to an aspect of the present disclosure.

FIG. 6 shows a top view of another tunable thermistor die 600 according to an aspect of the present disclosure. The die 600 includes the tunable thermistor 100 as shown and described in FIGS. 1-4, a first bond pad 602, a second bond pad 604, a first serial fuse group 640, and a second serial fuse group 660. The first bond pad 602 is selectively coupled to the FT metal stripe 121-126 via the first serial fuse group 640 and via the metal wires 631-636. The first serial fuse group 640 includes fuse components 641-645 connected in series between the FT metal stripes 121 and 126. The first bond pad 602 is coupled directly to the FT metal stripe 126 via metal wire 636. The first bond pad 602 is coupled indirectly to the FT metal stripe 125 via metal wire 635 and the fuse component 645. Likewise, the first bond pad 602 is coupled indirectly to the FT metal stripe 124-121 via metal wire 634-631 and the fuse components 645-641 in similar manners as described above. One or more of the fuse components 641-645 can be blown, such that the first bond pad 602 can be coupled to one or more FT metal stripes 121-126, thereby selectively accessing one or more of the sheet resistance segments ($\Delta R_{F1}$-$\Delta R_{F5}$) between the coupled FT metal stripes 121-126.

The second bond pad 604 is selectively coupled to the CT metal stripe 141-146 via the first serial fuse group 660 and via the metal wires 651-656. The second serial fuse group 660 includes fuse components 661-665 connected in series between the CT metal stripes 141 and 146. The second bond pad 604 is coupled directly to the CT metal stripe 146 via metal wire 656. The second bond pad 604 is coupled indirectly to the CT metal stripe 145 via metal wire 655 and the fuse component 665. Likewise, the second bond pad 604 is coupled indirectly to the CT metal stripe 144-141 via metal wire 654-651 and the fuse components 665-661 in similar manners as described above. One or more of the fuse components 661-665 can be blown, such that the second bond pad 604 can be coupled to one or more CT metal stripes 141-146, thereby selectively accessing one or more of the sheet resistance segments ($\Delta R_{C1}$-$\Delta R_{C5}$) between the coupled CT metal stripes 141-146.

Figure 7:
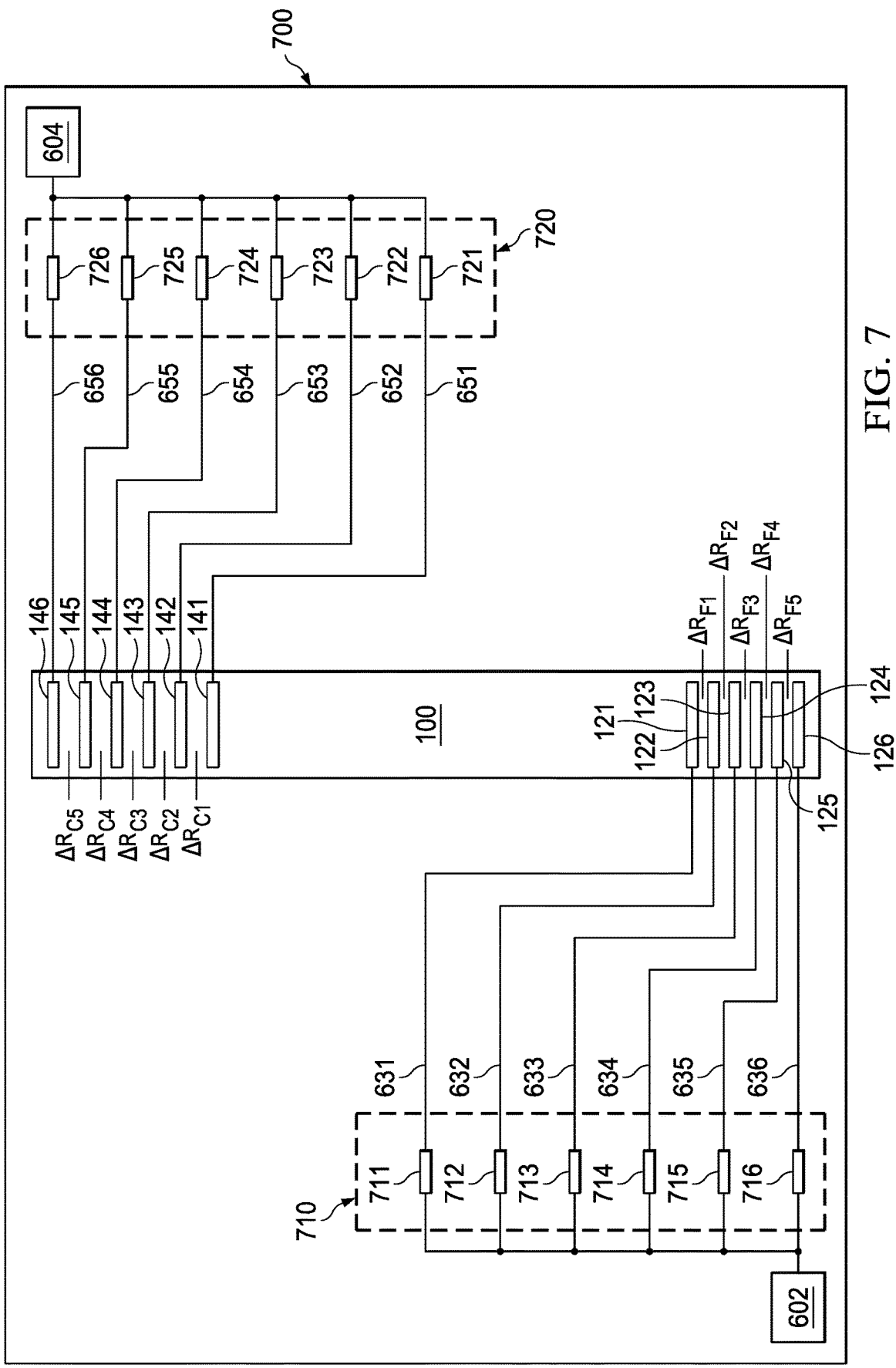
FIG. 7 shows a top view of yet another tunable thermistor die according to an aspect of the present disclosure.

FIG. 7 shows a top view of yet another tunable thermistor die 700 according to an aspect of the present disclosure. The die 700 is substantially similar to the die 600 except that the serial fuse groups 640 and 660 are replaced with parallel fuse groups 710 and 720 respectively. The first bond pad 602 is selectively coupled to the FT metal stripe 121-126 via the first parallel fuse group 710 and via the metal wires 631-636. The first parallel fuse group 710 includes fuse components 711-716 connected in parallel between the FT metal stripes 121 and 126. The first bond pad 602 is coupled to each one of the FT metal stripes 121-126 via a corresponding one of the fuse components 711-716 and a corresponding one of the metal wires 631-636. One or more of the fuse components 711-716 can be blown, such that the first bond pad 602 can be coupled to one or more FT metal stripes 121-126, thereby selectively accessing one or more of the sheet resistance segments ($\Delta R_{F1}$-$\Delta R_{F5}$) between the coupled FT metal stripes 121-126.

The second bond pad 604 is selectively coupled to the CT metal stripe 141-146 via the second parallel fuse group 720 and via the metal wires 651-656. The second parallel fuse group 720 includes fuse components 721-726 connected in parallel between the CT metal stripes 141 and 146. The second bond pad 604 is coupled to each one of the CT metal stripes 141-146 via a corresponding one of the fuse components 721-726 and a corresponding one of the metal wires 651-656. One or more of the fuse components 721-726 can be blown, such that the second bond pad 604 can be selectively coupled to one or more CT metal stripes 141-146, thereby selectively accessing one or more of the sheet resistance segments ($\Delta R_{C1}$-$\Delta R_{C5}$) between the coupled CT metal stripes 141-146.

Tunable thermistor dies 500, 600, and 700 each has its own advantages. In one aspect the tunable thermistor die 500 enables tuning using selective wire bonding, which does not require post fabrication trimming. The elimination of post fabrication trimming advantageously simplify semiconductor manufacturing process, thereby reducing manufacturing cost and complexity. In another aspect, tunable thermistor dies 600 and 700 apply post fabrication trimming techniques, such as a laser trim technique, for selectively cutting (or blowing) the one or more fuse components therein. Applying post fabrication trimming techniques may achieve a smaller die size because fewer bond pads are required (e.g., 2 bond pads instead of 12 bond pads). And a smaller die size helps achieve a lower die cost. Also, a small die will be able to fit into smaller packages, which allows the tunable thermistor dies 600 and 700 to be more easily adopted by a wide range of systems. In yet another aspect, the parallel arrangement of the fuse components in the tunable thermistor die 700 allow a single step of laser trim on each terminal. By contrast, the serial arrangement of the fuse components in the tunable thermistor die 600 may take more than a few steps of laser trim. Advantageously, the tunable thermistor die 700 enables a faster trimming process than the tunable thermistor die 600.

Consistent with the present disclosure, the term "configured to" purports to describe the structural and functional characteristics of one or more tangible non-transitory components. For example, the term "configured to" can be understood as having a particular configuration that is designed or dedicated for performing a certain function. Within this understanding, a device is "configured to" perform a certain function if such a device includes tangible non-transitory components that can be enabled, activated, or powered to perform that certain function. While the term "configured to" may encompass the notion of being configurable, this term should not be limited to such a narrow definition. Thus, when used for describing a device, the term "configured to" does not require the described device to be configurable at any given point of time.

Moreover, the term "exemplary" is used herein to mean serving as an example, instance, illustration, etc., and not necessarily as advantageous. Also, although the disclosure has been shown and described with respect to one or more implementations, equivalent alterations and modifications will be apparent upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Furthermore, terms of relativity, such as "about," "approximately," "substantially," "near," "within a proximity," "sufficient . . . to," "maximum," and "minimum," as applied to features of an integrated circuit and/or a semiconductor device can be understood with respect to the fabrication tolerances of a particular process for fabricating the integrated circuit and/or the semiconductor device. In addition, these terms of relativity can be understood within a framework for performing one or more functions by the integrated circuit and/or the semiconductor device.

More specifically, for example, the terms "substantially the same," "substantially equals," and "approximately the same" purport to describe a quantitative relationship between two objects. This quantitative relationship may prefer the two objects to be equal by design but with the anticipation that a certain amount of variations can be introduced by the fabrication process. In one aspect, a first resistor may have a first resistance that is substantially equal to a second resistance of the second resistor where the first and second resistors are purported to have the same resistance yet the fabrication process introduces slight variations between the first resistance and the second resistance. Thus, the first resistance can be substantially equal to the second resistance even when the fabricated first and second resistors demonstrate slight difference in resistance. This slight difference may be within 5% of the design target. In another aspect, a first resistor may have a first resistance that is substantially equal to a second resistance of a second resistor where the process variations are known a priori, such that the first resistance and the second resistance can be preset at slightly different values to account for the known process variations. Thus, the first resistance can be substantially equal to the second resistance even when the design values of the first and second resistance are preset to include a slight difference to account for the known process variations. This slight difference may be within 5% of the design target.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A thermistor device, comprising:
   a doped region extending along a longitudinal direction of a substrate surface;
   a first terminal region above the doped region, and having fine-tune (FT) metal stripes in parallel with and separated from each other by a first distance along the longitudinal direction; and
   a second terminal region above the doped region and spaced apart from the first terminal region by at least an inter-terminal distance, the second terminal region having coarse-tune (CT) metal stripes in parallel with and separated from each other by a second distance along the longitudinal direction, the second distance greater than the first distance, and the inter-terminal distance at least 10 times greater than the second distance.

2. The device of claim 1, wherein the second distance is at least 5 times greater than the first distance.

3. The device of claim 1, further comprising:
   a first bond pad coupled to a first of the FT metal stripes;
   a second bond pad coupled to a second of the FT metal stripes;
   a third bond pad coupled to a first of the CT metal stripes; and
   a fourth bond pad coupled to a second of the CT metal stripes.

4. The device of claim 1, further comprising:
   a first fuse coupled to a first of the FT metal stripes;
   a second fuse coupled to a second of the FT metal stripes;
   a first bond pad coupled to the first fuse and the second fuse;
   a third fuse coupled to a first of the CT metal stripes; and
   a fourth fuse coupled to a second of the CT metal stripes; and
   a second bond pad coupled to the third fuse and the fourth fuse.

5. The device of claim 1, further comprising:
   a first fuse coupled to a first of the FT metal stripes;
   a first bond pad coupled to the first fuse and a second of the FT metal stripes;
   a second fuse coupled to a first of the CT metal stripes; and
   a second bond pad coupled to the second fuse and a second of the CT metal stripes.

6. The device of claim 1, further comprising:
   heavily doped regions along a surface of the doped region and having a higher doping concentration than the doped region, each of the heavily doped regions coupled to one of the FT metal stripes, and each of the heavily doped regions having a first pitch along the longitudinal direction; and
   isolation structures interdigitating with the heavily doped regions along the surface of the doped region, the isolation structures having a second pitch less than the first pitch.

7. A thermistor device, comprising:
   an n doped region extending along a longitudinal direction of a substrate surface;
   a first terminal region in the n doped region, and having fine-tune (FT) n+ doped regions separated from each other by a first distance along the longitudinal direction, each of the FT n+ regions having a first pitch along the longitudinal direction;
   isolation structures interdigitating with the FT n+ doped regions along a surface of the n doped region, the isolation structures having a second pitch less than the first pitch; and
   a second terminal region in the n doped region and spaced apart from the first terminal region by at least an inter-terminal distance, the second terminal region having coarse-tune (CT) n+ doped regions separated from each other by a second distance along the longitudinal direction, the second distance greater than the first distance and less than the inter-terminal distance.

8. The device of claim 7, further comprising:
   a first bond pad coupled to a first of the FT n+ doped regions;

a second bond pad coupled to a second of the FT n+ doped regions;

a third bond pad coupled to a first of the CT n+ doped regions; and a fourth bond pad coupled to a second of the CT n+ doped regions.

9. The device of claim 7, further comprising:

a first fuse coupled to a first of the FT n+ doped regions;

a second fuse coupled to a second of the FT n+ doped regions;

a first bond pad coupled to the first fuse and the second fuse;

a third fuse coupled to a first of the CT n+ doped regions; and a fourth fuse coupled to a second of the CT n+ doped regions; and a second bond pad coupled to the third fuse and the fourth fuse.

10. The device of claim 7, further comprising:

a first fuse coupled to a first of the FT n+ doped regions;

a first bond pad coupled to the first fuse and a second of the FT n+ doped regions;

a second fuse coupled to a first of the CT n+ doped regions; and a second bond pad coupled to the second fuse and a second of the CT n+ doped regions.

* * * * *